(12) United States Patent
Incertis Carro

(10) Patent No.: US 6,940,491 B2
(45) Date of Patent: *Sep. 6, 2005

(54) METHOD AND SYSTEM FOR GENERATING HYPERLINKED PHYSICAL COPIES OF HYPERLINKED ELECTRONIC DOCUMENTS

(75) Inventor: Fernando Incertis Carro, Valencia (ES)

(73) Assignee: International Business Machines Corporation, Armonk, NY (US)

(*) Notice: Subject to any disclaimer, the term of this patent is extended or adjusted under 35 U.S.C. 154(b) by 741 days.

This patent is subject to a terminal disclaimer.

(21) Appl. No.: 10/028,218

(22) Filed: Oct. 25, 2001

(65) Prior Publication Data

US 2002/0152236 A1 Oct. 17, 2002

(30) Foreign Application Priority Data

Oct. 27, 2000 (EP) .................................. 00480098

(51) Int. Cl.[7] ................................................ G09G 5/00
(52) U.S. Cl. ....................... 345/173; 345/156; 715/700
(58) Field of Search ................................ 345/156, 173; 715/700, 702; 178/18.01, 18.09; 707/104.1

(56) References Cited

U.S. PATENT DOCUMENTS

| | | | | |
|---|---|---|---|---|
| 5,739,814 A | * | 4/1998 | Ohara et al. ................. 345/173 |
| 6,035,330 A | * | 3/2000 | Astiz et al. .................. 709/218 |
| 6,256,638 B1 | * | 7/2001 | Dougherty et al. ....... 707/104.1 |
| 6,330,976 B1 | * | 12/2001 | Dymetman et al. ......... 235/487 |
| 6,587,859 B2 | * | 7/2003 | Dougherty et al. ....... 707/104.1 |
| 6,771,283 B2 | * | 8/2004 | Carro .......................... 715/702 |
| 6,824,066 B2 | * | 11/2004 | Weyant ....................... 235/493 |

* cited by examiner

Primary Examiner—Ricardo Osorio
(74) Attorney, Agent, or Firm—Perman & Green, LLP

(57) ABSTRACT

A System for automatic generation of a hyperlink table from an electronic document comprising hyperlinks, and for identifying, locating and activating these hyperlinks from a physical copy of the electronic document. An electronic document is selected, a hyperlink table is created, and the hyperlink table is associated with a physical copy of the electronic document. For each page of the physical copy the hyperlink items comprised in the page are identified in the document, and an identification of each identified hyperlink item is stored in the table. The identification of information and/or service associated with each identified hyperlink item on the page is retrieved from the document and stored in the hyperlink table. The electronic coordinates of each identified hyperlinked item on the page are retrieved from the document and translated into physical coordinates on the page of the physical copy and stored in the hyperlink table.

19 Claims, 10 Drawing Sheets

Hypermedia selection and access from physical copies of electronic documents

FIG.1: Hypermedia access from electronic documents

FIG.2: Generating hyperlinked physical copies of electronic documents

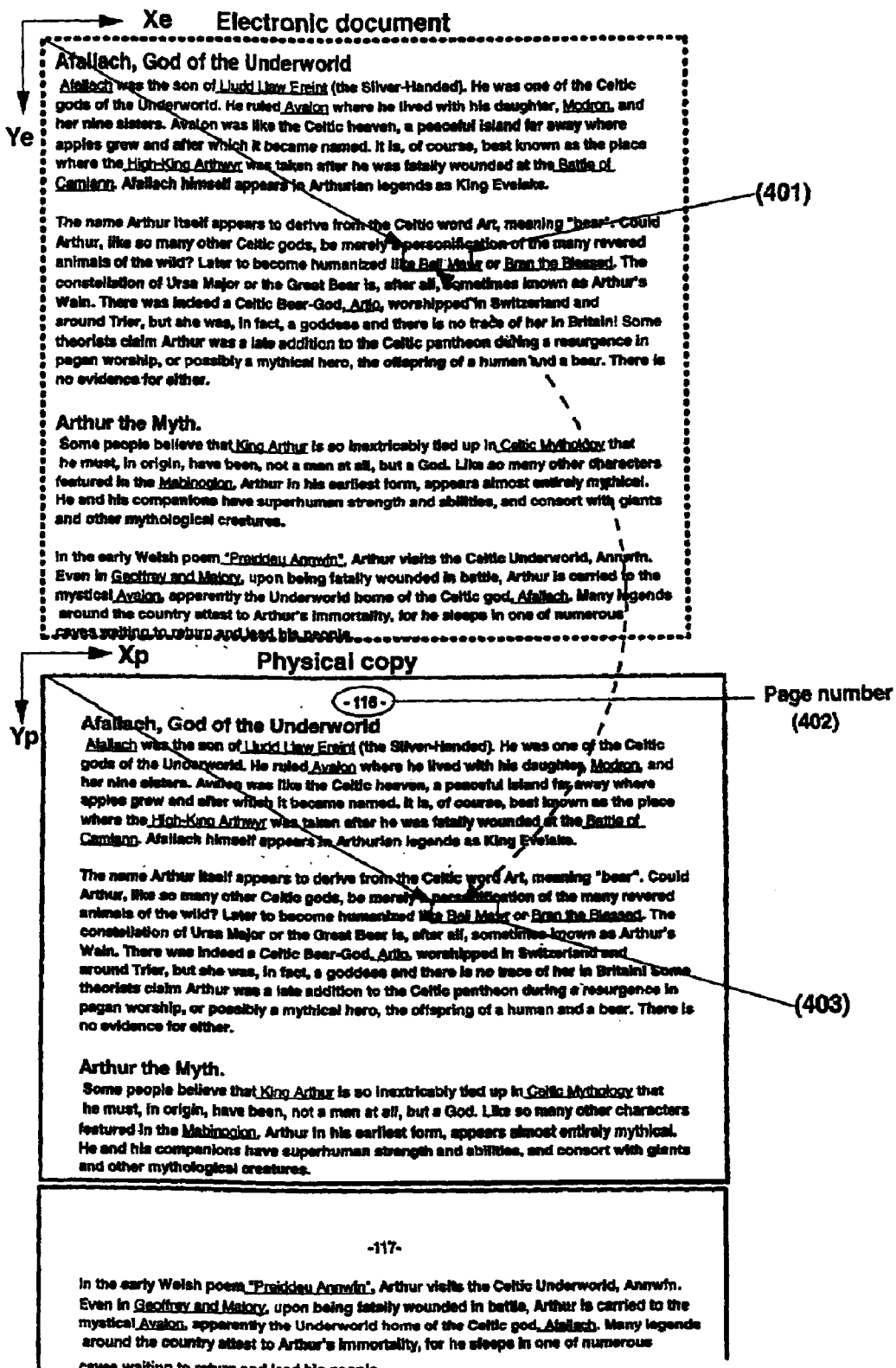
FIG. 4: Hyperlinks coordinates transformation (502)

| Doc: 0378 Title: "Early British Kingdoms" Author: David Nash Ford of Binfield, Berkshire, UK |||
|---|---|---|
| Date: 28 / 01 / 2000 ISBN: 84-344-0856-2 |||
| Pg: 3 X= 45 Y=130 X=205 Y=170 X= 75 Y=190 X=110 Y=235 | Buellt & Gwerthrynion Caer-Baddan (Bath) Caer-Celemion (Silchester) Ceredigion | http://freespace.virgin.net/david.ford2/buellt.html http://freespace.virgin.net/david.ford2/south.html#Gloui http://freespace.virgin.net/david.ford2/vortigern.html http://freespace.virgin.net/david.ford2/ceredigion.html |
| ........ X= 30 Y=260 ...... | Editor Phone Number | Phone: //54-26-555-1234 |
| Pg: 116 X= 30 Y= 95 X=255 Y=150 X=225 Y=160 X=190 Y=230 | Mabinogion Avalon Afallach Beli Mawr | http://www.cyberphile.co.uk/~taff/taffnet/mabinogion/mabinogion.htm http://freespace.virgin.net/david.ford2/avalon.html http://freespace.virgin.net/david.ford2/gods.html#Afallach http://freespace.virgin.net/david.ford2/gods.html#Beli |
| ......... Pg: 139 X= 25 Y= 30 X= 80 Y= 75 X=140 Y=135 ........ | St.Joseph of Arimathea The Kings of Dumnonia Eudaf Hen & Conan Meri | http://freespace.virgin.net/david.ford2/joseph.html http://freespace.virgin.net/david.ford2/dumnonia.html http://freespace.virgin.net/david.ford2/eudanc.html |

(501)  (504)  (503)

Fig. 5: Hyperlink table

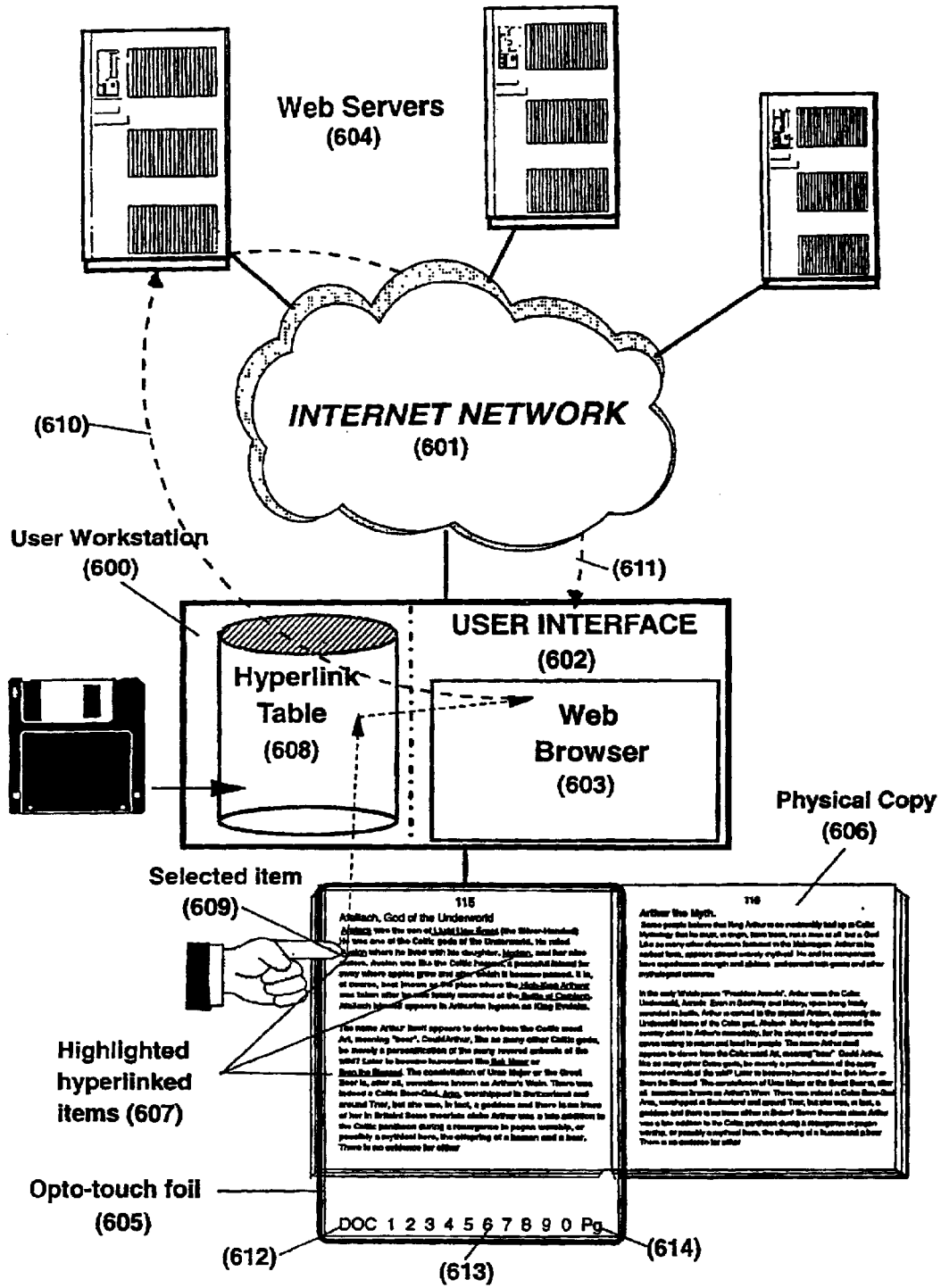
FIG. 6: Hypermedia selection and access from physical copies of electronic documents

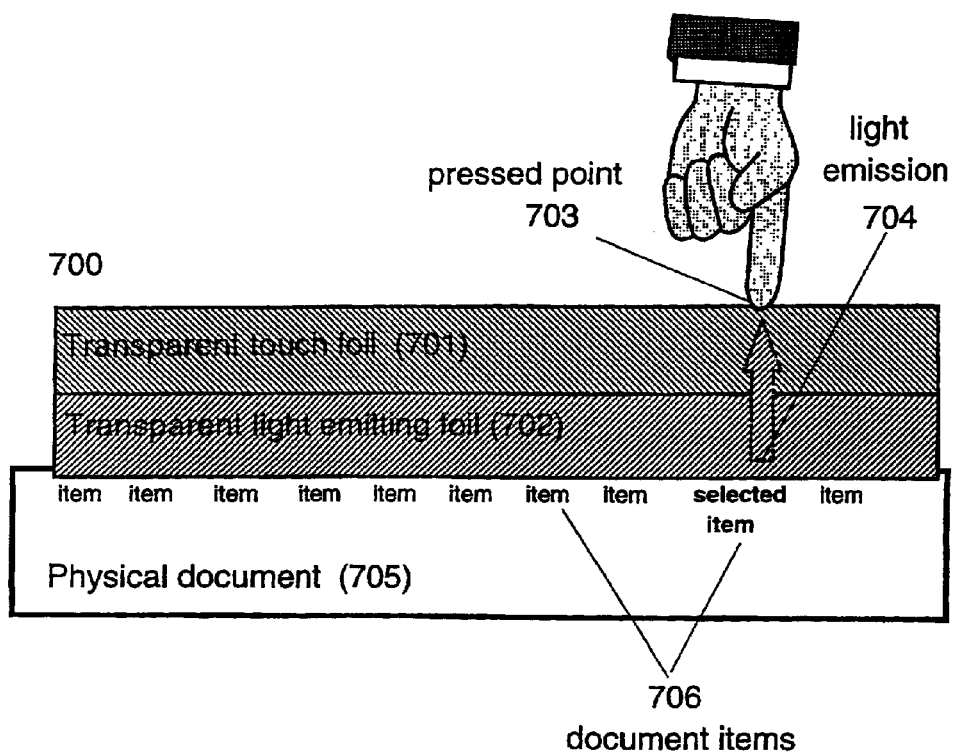
Fig. 7: The opto-touch foil

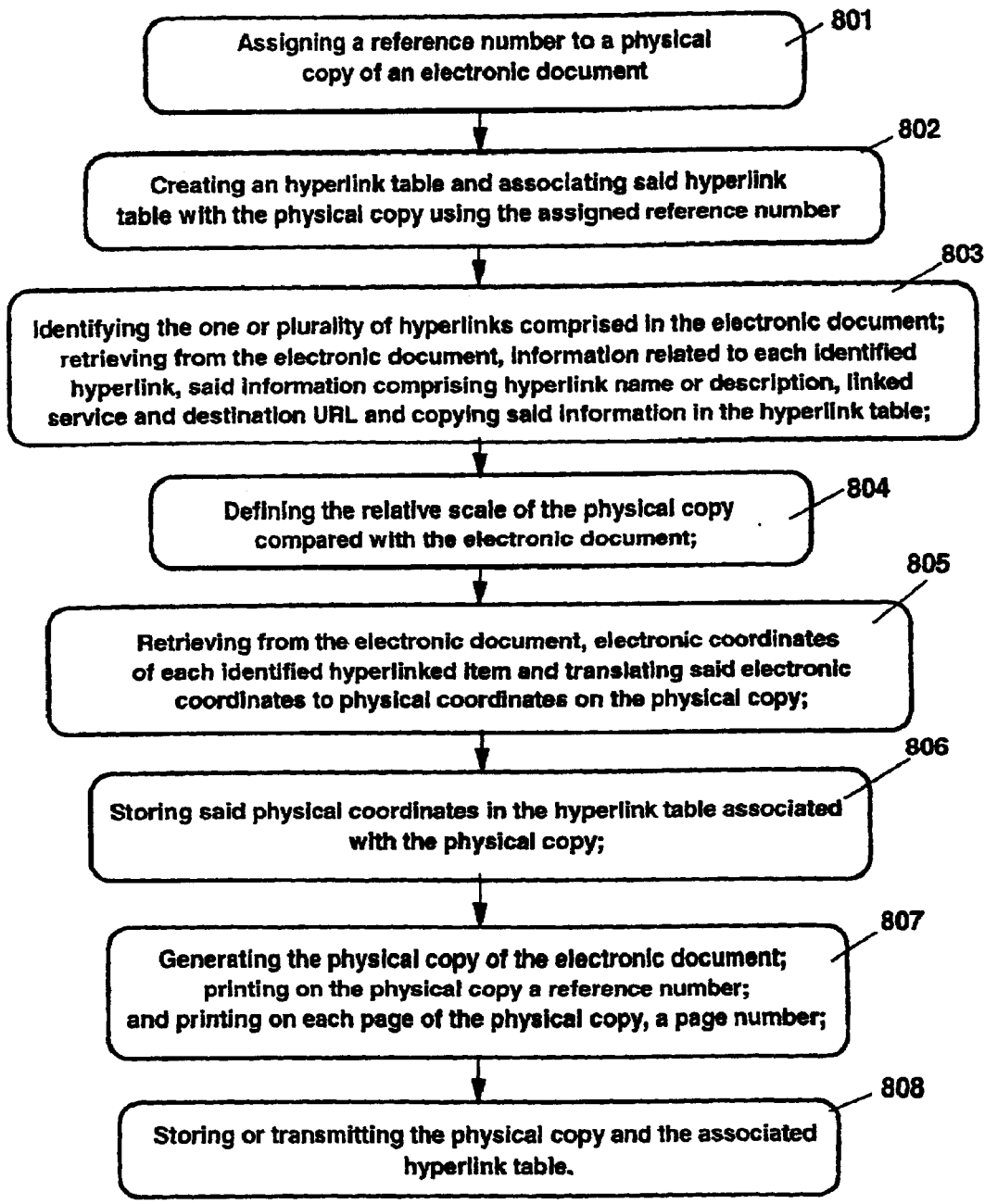
FIG.8: Method of creating hyperlink tables of physical copies of electronic documents

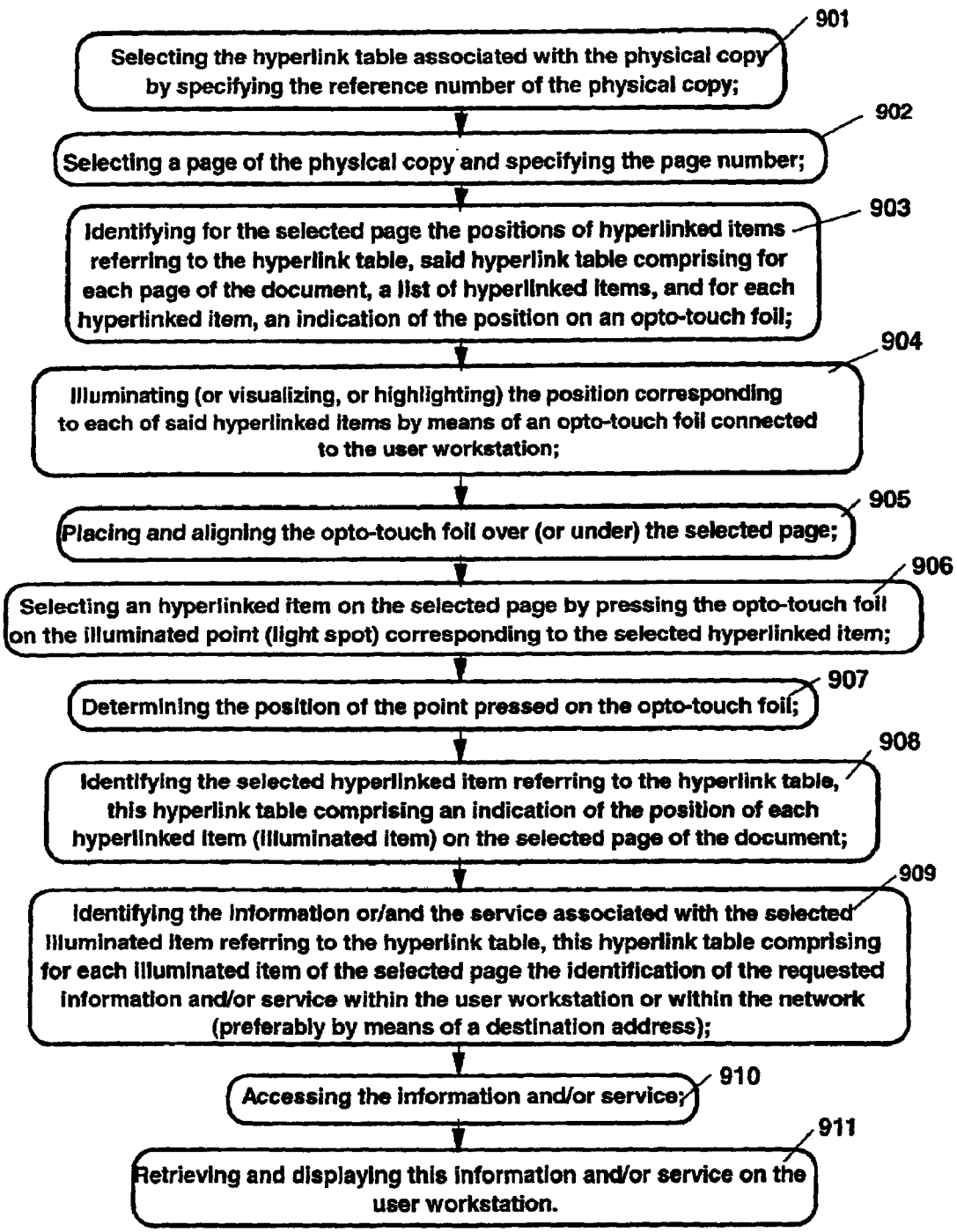
FIG. 9: Triggering hyperlinks from a physical copy

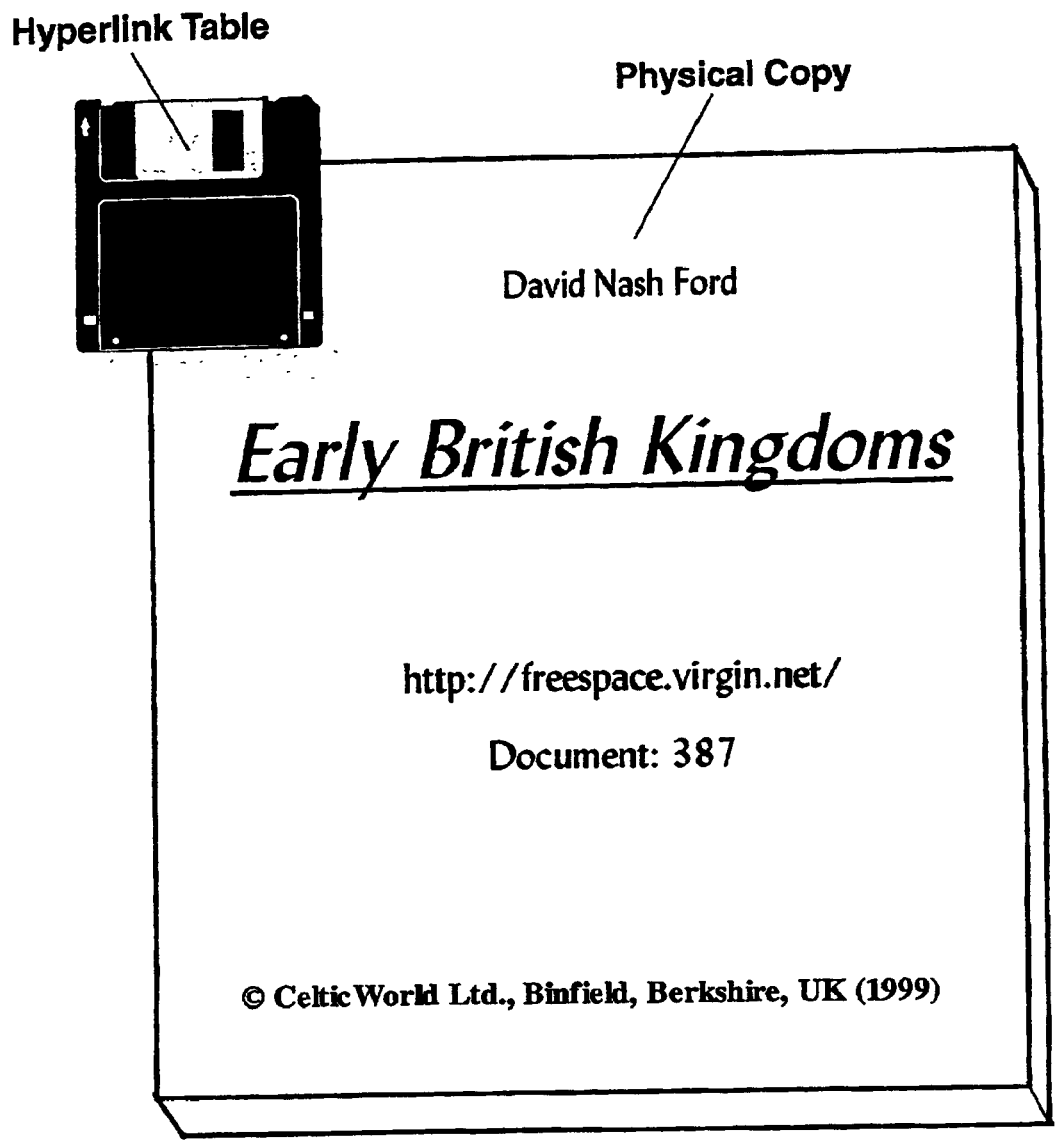
FIG. 10: Physical copy and associated hyperlink table

METHOD AND SYSTEM FOR GENERATING HYPERLINKED PHYSICAL COPIES OF HYPERLINKED ELECTRONIC DOCUMENTS

FIELD OF THE INVENTION

The present invention relates to interactive hypermedia systems, electronic publishing and "print-on-demand" systems, and more particularly to a method and system for generating, from an electronic document comprising a plurality of hyperlinks to multimedia information or services, a physical document copy of the electronic document, and a look-up table comprising, for all hyperlinks present in the electronic document, corresponding physical coordinates (i.e., page number and physical page coordinates) in the physical copy.

BACKGROUND OF THE INVENTION

Internet

The Internet is a global network of computers and computers networks (the "Net"). The Internet connects computers that use a variety of different operating systems or languages, including UNIX, DOS, Windows, Macintosh, and others. To facilitate and allow the communication among these various systems and languages, the Internet uses a language referred to as TCP/IP ("Transmission Control Protocol/Internet Protocol"). TCP/IP protocol supports three basic applications on the Internet:

transmitting and receiving electronic mail,
 logging into remote computers (the "Telnet"), and
 transferring files and programs from one computer to another ("FTP" or "File Transfer Protocol").

TCP/IP

The TCP/IP protocol suite is named for two of the most important protocols:

a Transmission Control Protocol (TCP), and
 an Internet Protocol (IP).

Another name for it is the Internet Protocol Suite. The more common term TCP/IP is used to refer to the entire protocol suite. The first design goal of TCP/IP is to build an interconnection of networks that provide universal communication services: an internetwork, or Internet. Each physical network has its own technology dependent communication interface, in the form of a programming interface that provides basic communication functions running between the physical network and the user applications. The architecture of the physical networks is hidden from the user. The second goal of TCP/IP is to interconnect different physical networks to form what appears to the user to be one large network.

TCP is a transport layer protocol providing end to end data transfer. It is responsible for providing a reliable exchange of information between 2 computer systems. Multiple applications can be supported simultaneously over one TCP connection between two computer systems.

IP is an internetwork layer protocol hiding the physical network architecture bellow it. Part of the communicating messages between computers is a routing function that ensures that messages will be correctly directed within the network to be delivered to their destination. IP provides this routing function. An IP message is called an IP Datagram.

Application Level protocols are used on top of TCP/IP to transfer user and application data from one origin computer system to one destination computer system. Such Application Level protocols are for instance File Transfer Protocol (FTP), Telnet, Gopher, Hyper Text Transfer Protocol (HTTP).

IP Router

A "Router" is a computer that interconnects two networks and forwards messages from one network to the other. Routers are able to select the best transmission path between networks. The basic routing function is implemented in the IP layer of the TCP/IP protocol stack, so any host (or computer) or workstation running TCP/IP over more than one interface could, in theory, forward messages between networks. Because IP implements the basic routing functions, the term "IP Router" is often used. However, dedicated network hardware devices called "Routers" can provide more sophisticated routing functions than the minimum functions implemented in IP.

World Wide Web

With the increasing size and complexity of the Internet, tools have been developed to help find information on the network, often called navigators or navigation systems. Navigation systems that have been developed include standards such as Archie, Gopher and WAIS. The World Wide Web ("WWW" or "the Web") is a recent superior navigation system. The Web is:

an Internet-based navigation system,
 an information distribution and management system for the Internet, and
 a dynamic format for communicating on the Web.

The Web seamlessly, for the use, integrates format of information, including still images, text, audio and video. A user on the Web using a graphical user interface ("GUI", pronounced "gooey") may transparently communicate with different host computers on the system, different system applications (including FTP and Telnet), and different information formats for files and documents including, for example, text, sound and graphics.

Hypermedia

The Web uses hypertext and hypermedia. Hypertext is a subset of hypermedia and refers to computer-based "documents" in which readers move from one place to another in a document, or to another document, in a non-linear manner. To do this, the Web uses a client-server architecture. The Web servers enable the user to access hypertext and hypermedia information through the Web and the user's computer. (The user's computer is referred to as a client computer of the Web Server computers.) The clients send requests to the Web Servers, which react, search and respond. The Web allows client application software to request and receive hypermedia documents (including formatted text, audio, video and graphics) with hypertext link capabilities to other hypermedia documents, from a Web file server. The Web, then, can be viewed as a collection of document files residing on Web host computers that are interconnected by hyperlinks using networking protocols, forming a virtual "web" that spans the Internet.

Uniform Resource Locators

A resource of the Internet is unambiguously identified by a Uniform Resource Locator (URL), which is a pointer to a particular resource at a particular location. A URL specifies the protocol used to access a server (e.g. HTTP, FTP, . . . ), the name of the server, and the location of a file on that server. To insure that data is sent to and received by the appropriate systems on the Internet, every "device" (i.e., PC workstation, HTTP Server, File Server, etc.) has a unique address, called IP address. The IP address is presently a 32 bit binary address, which is fine for computers to read, but is cumbersome for a human user to memorize or use. To make them more "user-friendly", symbolic names are assigned to IP addresses. The mapping between IP addresses and symbolic names, for example myhost.ibm.com, is done by a "Domain Name Server".

Hyper Text Transfer Protocol

Each Web page that appears on client monitors of the Web may appear as a complex document that integrates, for example, text, images, sounds and animation. Each such page may also contain hyperlinks to other Web documents so that a user at a client computer using a mouse may click on icons and may activate hyperlink jumps to a new page (which is a graphical representation of another document file) on the same or a different Web server.

Web Servers

A Web server is a software program on a Web host computer that answers requests from Web clients, typically over the Internet. All Web servers use a language or protocol to communicate with Web clients which is called Hyper Text Transfer Protocol ("HTTP"). All types of data can be exchanged among Web servers and clients using this protocol, including Hyper Text Markup Language ("HTML"), graphics, sound and video. HTML describes the layout, contents and hyperlinks of the documents and pages. Web clients when browsing:

convert user specified commands into HTTP GET requests, connect to the appropriate Web server to get information, and wait for a response. The response from the server can be the requested document or an error message.

After the document or an error message is returned, the connection between the Web client and the Web server is closed.

First version of HTTP is a stateless protocol. That is, with HTTP there is no continuous connection between each client and each server. The Web client using HTTP receives a response as HTML data or other data. This description applies to version 1.0 of HTTP protocol, while the new version 1.1 breaks this barrier of stateless protocol by keeping the connection between the server and client alive under certain conditions.

Web Browser

The Web client formats and presents the data received from the Web server for example by activating an ancillary application such as a sound player. The Web Client is also referred to as the Web browser, since it in fact browses documents retrieved from the Web Server. Web browsers are used by the Internet user to convert information received into a format that can be displayed by the Web browser on the video screen (or through the audio speakers) of the user workstation. The Web browser is thus an application program that runs on the user workstation and that acts as a translator of HTML information. Several different commercial Web browsers are available including, for example, the Netscape Communicator browser. The Web browser is also used to recognize clicks on the screen made by a user with the pointing device of his workstation. When the user clicks with his pointing device on a portion of the screen associated with a hypertext link, the Web browser recognizes the user's action as a request to get a file from a Web site identified by an URL. The Web server delivers the data to the Web browser, which translates it into a format that can be presented to the user.

Sometimes, the information returned from the Web server (and subsequently to the Web browser) cannot be processed by the particular Web browser used in the user workstation. This occurs, for example, when video data is returned to a Web browser that does not have the appropriate application software to display the video on the user workstation. In this case, the Web browser enlists a specific application resident on the Web client to display the incoming data. For example, when the Web browser receives video data from the Internet, it frequently opens a viewer, which appears as a window on the screen of the Web client. This viewer will process the incoming video data through the Web browser and will display the video on the user's screen. The Web browser knows which viewer is required for a particular file based on an extension (Multipurpose Internet Mail Extension (MIME)) attached to the file name.

Activating Hyperlinks

On an internet page, hyperlinks can be assigned to textual information or to pictures. A hypertext link may appear as a picture, or as a word or sentence, possibly underlined or otherwise accentuated to indicate that it is an embedded link and not just normal, informative text.

FIG. 1 shows a conventional method for activating hyperlinks present in an electronic document. When the user clicks on an hyperlink, the Web browser records the position of the pointer. The Web browser then refers to a look-up table to identify the URL address assigned to the position of the pointer. When clicked, the Web browser program requests a connection to the Web server hosting the file, and also requests from the Web server the file identified by the URL. Once the Web server accepts the connection requested by the Web browser, the Web server transmits back to the Web browser the requested file. Once the requested file is received, the Web browser delivers or presents the content of the file to the requesting user.

By placing and clicking the pointing device on the text or on a picture, the user selects a new internet page. In either case, text or picture, the Internet page comprises linked locations or "hot spots," located at (X, Y) coordinates on the page. When the Web browser detects the click of a pointing device over a "hotspot, it identifies the associated URL and sends the filename portion of the URL to the Web server located at the domain name portion of the URL. A picture may further be flagged as having a "map" associated with it. If it does, the relative coordinates of the click within the picture are sent to the Web server as well. The Web server then determines which page to return, based on the location of the click.

User Interaction with Electronic and Physical Documents

During the last years, due mainly to the widespread use of personal computers and CD-ROMs and due to the universal access of millions of users to the World Wide Web, the "multimedia publishing" has veritably exploded. An enormous amount of multimedia and hypermedia information combining text, images and sounds, are now accessible to users of personal computers.

During many years, conventional electronic documents (e.g., e-books) were displayed on computer screens on a page-by-page format. The page-by-page presentation has made the on-line review of large electronic documents a slow and inefficient operation. To solve this problem, specific programs for reading softcopy book have been devised. For example, IBM BookManager (TM) or Adobe Acrobat (TM) programs have been specially designed to help users to manage, search and read books directly on the screen.

Also, when browsing a document on the Web, the problem with most conventional Web browsers is that, when a user selects and activates a hyperlink, a new page is loaded in the Web browser, and this new page completely replaces the previous page. The previous page is not displayed simultaneously with the new page, although the user can easily go back and forth between the two pages (the content of the pages is commonly cached), using the familiar browser commands "forward" and "backward". However, the user often desires to see at the same time both the original page and the linked page, but this is not possible with conventional Web browsers unless doing complicated actions. For example, two different windows can be opened; some Web browsers allow multiple parent windows while others only allow multiple children windows. In either case, additional user actions are required. It may also be difficult to arrange the two windows on the screen so as to satisfactorily view the two pages. Even when a feature in a Web browser allows the simultaneous display of multiple fields or "frames" within a single window, this feature cannot be used to simultaneously display an original page and a linked page. All of the frames within the window collectively constitute a "page" or document, so when a hyperlink in any given frame within the window is selected, the original page is still replaced.

For the reasons discussed above and for many other technical or ergonomic reasons, it is a fact today that reading paper cannot be compared with reading an electronic media (e.g., an e-book by using a MS Reader). Even if the enthusiasm of the public for new computer-based multimedia services has been considered by many analysts as a threat to the conventional forms of hard-copied publishing, the experience shows that reading paper remains preferable for most people, whether they are familiar with computers or not.

For most people, paper has a number of advantages:

paper is easy to read, mark, and manipulate;

paper is portable, familiar and can be easily distributed.

In fact, people are very skilled at browsing through paper catalogs, magazines, newspapers, maps and books by flipping through the pages and glancing at pictures and text. A collection of printed color photographs can be much easily and quickly browsed than a sequence of computer screens. In publication entitled "The Last Book", IBM Systems Journal, Vol 36, No. 3 Vol 36, No. 3—1997, by J. Jacobson, B. Comiskey, C. Turner, J. Albert, and P. Tsao of the MIT Media Laboratory, the authors compare printed books and computer screens in the following terms:

"A book represents a fundamentally different entity than a computer screen in that it is a physical embodiment of a large number of simultaneous high-resolution displays. When we turn the page, we do not lose the previous page. Through evolution the brain has developed a highly sophisticated spatial map. Persons familiar with a manual or textbook can find information that they are seeking with high specificity, as evidenced by their ability to remember whether something that was seen only briefly was on the right side or left side of a page, for instance. Furthermore their haptic connection with the brain's spatial map comprises a highly natural and effective interface, when such information is embodied on actual multiple physical pages.

Another aspect of embodying information on multiple, simultaneous pages is that of serendipity and comparison. We may leaf through a large volume of text and graphics, inserting a finger bookmark into those areas of greatest interest. Similarly, we may assemble a large body of similar matter in order to view elements in contrast to one another, such as might be done to determine which of a particular set of graphical designs is most satisfying".

Notwithstanding the advances made in computer technology in the field of recording and processing data, the use of paper has not decreased. Paper continues to be the information display system the most used. Among all other display systems, paper is portable, available everywhere, can be easily used and manipulated and provides the highest resolution. The accumulation of documents from meetings, mail, paper-based creative and planning work is a common experience. Moreover, because a paper document is more usable than a computer screen for displaying information, it is obvious that a large portion of the paper accumulation results from the print of electronic documents. Most people perform their daily work (such as reading, revisions, additions, meetings, projects, presentations, annotations) on paper and use printed copies of original electronic documents.

As a conclusion, even if many electronic document systems (e.g., Web browsers, e-books readers) attempt to replace paper by providing new applications such as the access to multimedia information and services, however a lot of users today still work with paper. Many analysts admit that: "consumers will insist on printing most of their documents" (e.g., e-books, for reading, for browsing, for consulting). Moreover, a new publishing technology that has been named "Printing-on-demand" is contributing to keep alive this preference of people for printed information.

Print-on-demand is in fact a new printing technology, and also a new form of information distribution that makes possible the production of very low print runs. It is a production system where just the required number of copies is printed. Unlike so-called "short-run" printing, defined as traditional book printing in small batches (50–100) for very limited stockholding, print-on-demand enables the printing of a single book in response to a particular customer order. That means that on-demand titles never goes into stock. The ultimate step in print-on-demand is the production of one copy at a time. This technology dramatically reduces the storage of hard copies and thus reduces the inventories, the distribution costs and the expense for recycling or destroying unused copies. Moreover this technology enables on-demand reprinting, which means that titles no longer fall "out of print". Print-on-demand requires the application of so-called "digital printing", which is a computer-to-print method producing electronically black and white or multicolored printed products directly from an information system using a digitally controlled printing system.

The widespread use of Internet and mobile communications offer a lot of new opportunities to combine electronic and printed media, in other words to create "media-adaptive multimedia" products. The philosophy behind the concept of "media-adaptive multimedia" is that information must be transferred to users in a form adapted to their needs. In fact, traditionally printed documents, digitally printed documents and multimedia products must be complementary. The different components must be combined depending on the users needs. To facilitate this evolution, the "electronic content should be accessible directly from the printed medium".

When an electronic document comprising:

hypertext (e.g. an e-book with hyperlinks from different items—words, pictures, foot notes, symbols, icons—to multimedia information or services), or attachements (e.g., an e-mail with several files attached, anchored by file icons or "hotspots" on the same note), is printed, the fundamental characteristic of this electronic document which consists in accessing multimedia services disappears. It becomes impossible to activate the hyperlinks comprised in the electronic document or to edit and view the attachments from the printed copy. Complementary means are required to identify the locations of the hyperlinks on the printed surface of the physical copy and to activate them directly.

Therefore, there is a real need to provide users with new systems and methods for improving physical copies of electronic (hyperlinked) documents, (e.g., e-books, Web pages, Lotus Notes, MS Word, Lotus WordPro or Adobe Portable Document Format (PDF)) and in particular for accessing from a physical copy information accessible from an original electronic document, said information comprising images, sounds and/or additional text.

None of the methods referenced in the prior art describes a system that would enable a user to automatically generate, from an electronic hyperlinked document, the information required to access to hypermedia information or services simply by touching with a fingertip a physical unmarked copy of the original electronic document, (for instance, to edit and view an attached file simply by touching the printed icon of the attachment on the printed copy of an IBM Lotus Notes note).

OBJECTS OF THE INVENTION

It is an object of the present invention to improve the current systems and methods of selecting and accessing electronic multimedia information or services.

It is another object of the present invention to select and to access from a physical copy the electronic multimedia information or services that can be accessed from the original electronic document.

It is another object of the present invention to select and access electronic multimedia information or services simply by touching a physical copy of an electronic document.

SUMMARY OF THE INVENTION

The present invention discloses a method and a system for automatically generating an hyperlink table, from an electronic document comprising hyperlinks, for identifying, locating and activating these hyperlinks from a physical copy of this electronic document. The method, for use in a user system, comprises the steps of:
selecting an electronic document;
creating an hyperlink table;
associating said hyperlink table with a physical copy of said electronic document, said physical copy comprising one or a plurality of pages;
for each page of the physical copy:
  identifying in the electronic document, the one or plurality of hyperlink items comprised in the page;
  storing in the hyperlink table an identification of each identified hyperlink item;
  retrieving from the electronic document identification and location of information and/or service associated with each identified hyperlink item on the page;
  storing in the hyperlink table said identification and location of information and/or service associated with each identified hyperlink item;
  retrieving from the electronic document, electronic coordinates of each identified hyperlinked item on the page;
  translating said electronic coordinates into physical coordinates on the page of the physical copy;
  storing said physical coordinates in the hyperlink table.

The foregoing, together with other objects, features, and advantages of this invention can be better appreciated with reference to the following specification, claims and drawings.

BRIEF DESCRIPTION OF THE DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein

FIG. 4 shows the method for translating the position (coordinates Xe,Ye) of an hyperlink on an electronic document into a position (page number and coordinates Xp,Yp)) on a physical copy of said electronic document according to the present invention.

FIG. 5 shows an example of hyperlink table automatically generated from an electronic document according to the present invention.

FIG. 6 shows how the different components of the invention interact for activating an hyperlink from the physical copy of the electronic document.

FIG. 7 shows the internal structure of an opto-touch foil as used in the present invention.

FIG. 8 is a flow chart of the method for automatically generating an hyperlink table associated with the physical copy of an electronic document according to the present invention.

FIG. 9 is a flow chart of the method for activating hyperlinks from a physical copy of an electronic document according to the present invention.

FIG. 10 shows a physical copy of an electronic document and its associated hyperlink table according to the present invention.

PREFERRED EMBODIMENT OF THE INVENTION

Figure 3:
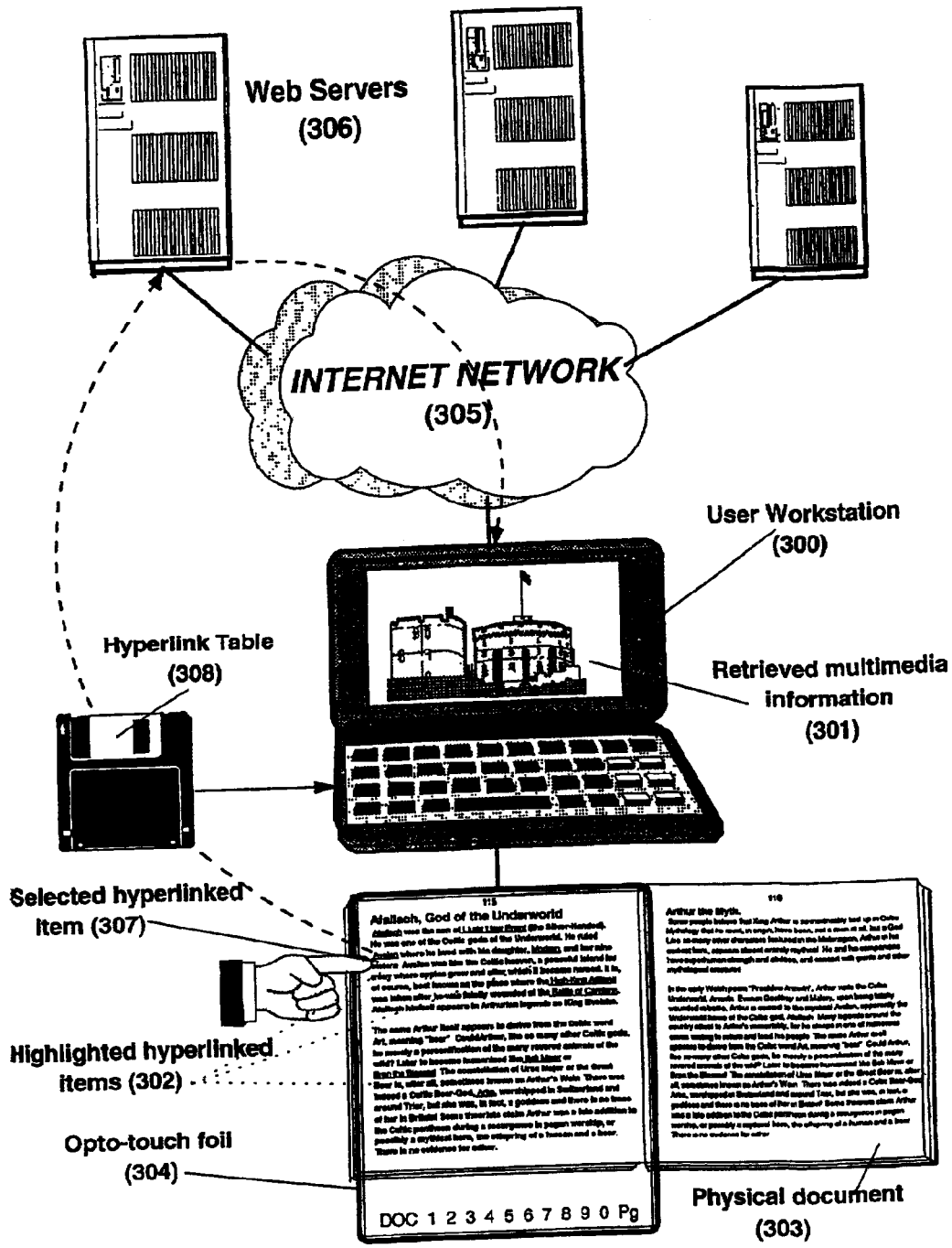
FIG. 3 shows the system and method for selecting and accessing hypermedia information or services from a physical document.

System for Selecting and Accessing Multimedia Information from Physical Documents Non-published european patent application FR9-2000-0022 (European Application n° 00480037.1) entitled "Method and System for Accessing Interactive Multimedia Information or Services by Touching Highlighted Items on Physical Documents", by Fernando INCERTIS CARRO, discloses a method and system for creating hyperlinks from selected items (e.g., words, pictures, foot notes, symbols, icons) on hard-copy documents to locally or remotely accessible servers, for highlighting by means of a light emitting source the position of each selected item, and for activating anyone of said hyperlinks simply by touching the hard-copy document over said highlighted items. As shown in FIG. 3, the system according to the referenced invention comprises:

(303) A physical document (e.g., a book) comprising one or a plurality of pages.

(304) An opto-touch foil connected to a user workstation. The opto-touch foil is to be placed over or under a page (or a portion) of the document.

(300) A user workstation (preferably connected to a communication network) for accessing and displaying multimedia information and services.

Physical Document

The physical document (303) can be of any kind, for example, a newspaper, a geographic map, a novel book, a text book, a technical book, a commercial catalog or even any other type of engraved, written, or printed surface (e.g., a painting in a museum of art). The material of the document can be paper, plastic, wood or any other material.

Opto-Touch Foil

In a preferred embodiment of the referenced patent application, the opto-touch foil is built by stacking a transparent resistive or capacitive film, of the type commonly used to manufacture touch screens over a transparent organic light emitting device film (TOLED film). FIG. 7 shows the cross section of an opto-touch foil (700) comprising:

- a transparent resistive or capacitive touch foil (701), of the type used commonly to manufacture touch screens. The generated signal is generally proportional to the coordinates of the point that is pressed or touched (703),
- a transparent light emitting foil (702), which is a transparent, bright, self-emitting display that can emit light (704) from either one or both surfaces.

The combination of both foils (i.e., the touch foil stacked over the light emitting foil) forms an opto-touch foil (700). FIG. 7 represents an opto-touch foil placed and aligned over a physical document (705) comprising a plurality of items (706) (i.e., words, pictures, icons, etc.) printed (or written, painted, engraved . . . ) on its surface. One example of touch foil technology it would be possible to use, is the TouchTek4 (4-wire Analog Resistive Touchscreens) of MICRO TOUCH company (TouchTek™ is a trademark of the MICRO TOUCH Company). The TouchTeck4 technology is fully described in the Web site of MICRO TOUCH Company at http://www.microtouch.com/.

The light emitting foil may be made of an array of TOLED's (Transparent Organic Light Emitting Devices), of the type used today to create vision area displays on windshields, cockpits, helmets and eyeglasses. TOLED displays, which can be up to 85% transparent when not energized are today manufactured with standard silicon semiconductors. One example of light emitting foil technology it would be possible to use is the technology used for the TOLEDs manufactured by UNIVERSAL DISPLAY CORPORATION. The TOLED technology is fully described in the Web site of UNIVERSAL DISPLAY CORPORATION at
http://www.universaldi splay.com/toled.html.

User Workstation

The user workstation (300) is used to access information and/or services stored locally or located on one or a plurality of servers (306) connected to the network (305). The user workstation may be, for example, an Internet appliance, a multimedia Personal Computer (PC), a set-top box, a TV monitor, a game console . . . The opto-touch foil may communicate with the user workstation by means of a cable, a wire pair, an infrared link, or a wireless radio link.

Information and/or Service Access

When the user goes to a new portion of a document (303) (a new page of a book for example), he places the opto-touch foil (304) over (or under) the selected portion and enters in the workstation the reference of this portion (the page number for instance). In a preferred embodiment of the referenced invention, the page number can be entered simply by touching some buttons marked on the top (or bottom) of the opto-touch foil. The page number may be also entered directly by means of the keyboard, the mouse or the touch screen of the user workstation or by any other means such as a bar code reader . . . The hyperlinked items (items that can be selected to access information on a server) on this page, are then automatically illuminated and highlighted on the surface of the document by the light emitting foil. This light emitting foil operates under the control of the user workstation (300). This illumination and highlighting allows the localization and identification of all hyperlinked items on the page selected by the user.

Illuminated items are selected by pressing the opto-touch foil. When the user selects an item (307) among all illuminated items (302), the user workstation (300) receives from the opto-touch foil (304) a signal indicating the position of this selected item on the physical document (303). The user workstation identifies and locates referring to a hyperlink table (308) the information and/or the service associated with the position of the selected item (307). If the information and/or service is located in a remote server (306), a request is sent to this server. If the information and/or the service is stored in the user workstation (300), then this information and/or service is accessed locally.

In a particular embodiment of the referenced invention, shown in FIG. 6, the user workstation (600) is connected to the Internet network (601). The user workstation comprises a user interface (602) including a Web Browser (603) (also called "Web Client") to access the World-Wide-Web (WWW). In order to access the Web pages associated with an illuminated item (607) on a document (606), the user touches with its finger the opto-touch foil (605) over the illuminated item (609) he wishes to select. The position of the illuminated item selected on the opto-touch foil identifies the Web server (604) and the Web pages the user wants to retrieve and display. The Web Browser program (603) sends a HTTP request (610) to the identified Web Server (604). The response (611) to the request (HTTP response) is sent by the Web Server (604) in the reverse direction to the Web Browser (603). The HTTP response comprises the requested Web pages associated with the selected illuminated item.

Manual Creation of Hyperlinks on a Physical Document

The foregoing referenced invention also discloses a manual method of creating hyperlinks, by touching hyperlinked items on a physical document. The method comprises the steps of:

- creating a hyperlink table for a physical document; said physical document comprising one or a plurality of pages;
- receiving and storing in said hyperlink table an identification of the physical document;
- for each page of said physical document:
  - receiving and storing in said hyperlink table an identification of the page and an identification of hyperlinked items defined by the user on said page;
  - receiving and storing in said hyperlink table identification and location of information or service associated with each defined hyperlinked item;
  - determining the position of points pressed on a opto-touch foil; said opto-touch foil being placed and aligned over or under the page of the physical document; said opto-touch foil being pressed at points corresponding to the position of said defined hyperlinked items;
  - storing the position of the points pressed in the hyperlink table, said hyperlink table comprising for each hyperlinked item, an indication of its position on the page.

The herein referenced method for building the hyperlink table of a physical document has the main drawback of being a cumbersome, time consuming and manually intensive procedure.

In many instances, for example when the physical document is an hard-copy of an original hyperlinked electronic document, it would be advantageous to automatically generate directly from the original electronic document, the hyperlink table required for identifying, highlighting and activating the hyperlinks from the physical copy (e.g., a printed copy, a micro-filmed copy, a photograph or a faxed copy). An object of the present invention is to automatically generate an hyperlinked hard-copy of any hyperlinked electronic document.

Automatic Generation of an Hyperlink Table

Figure 1:
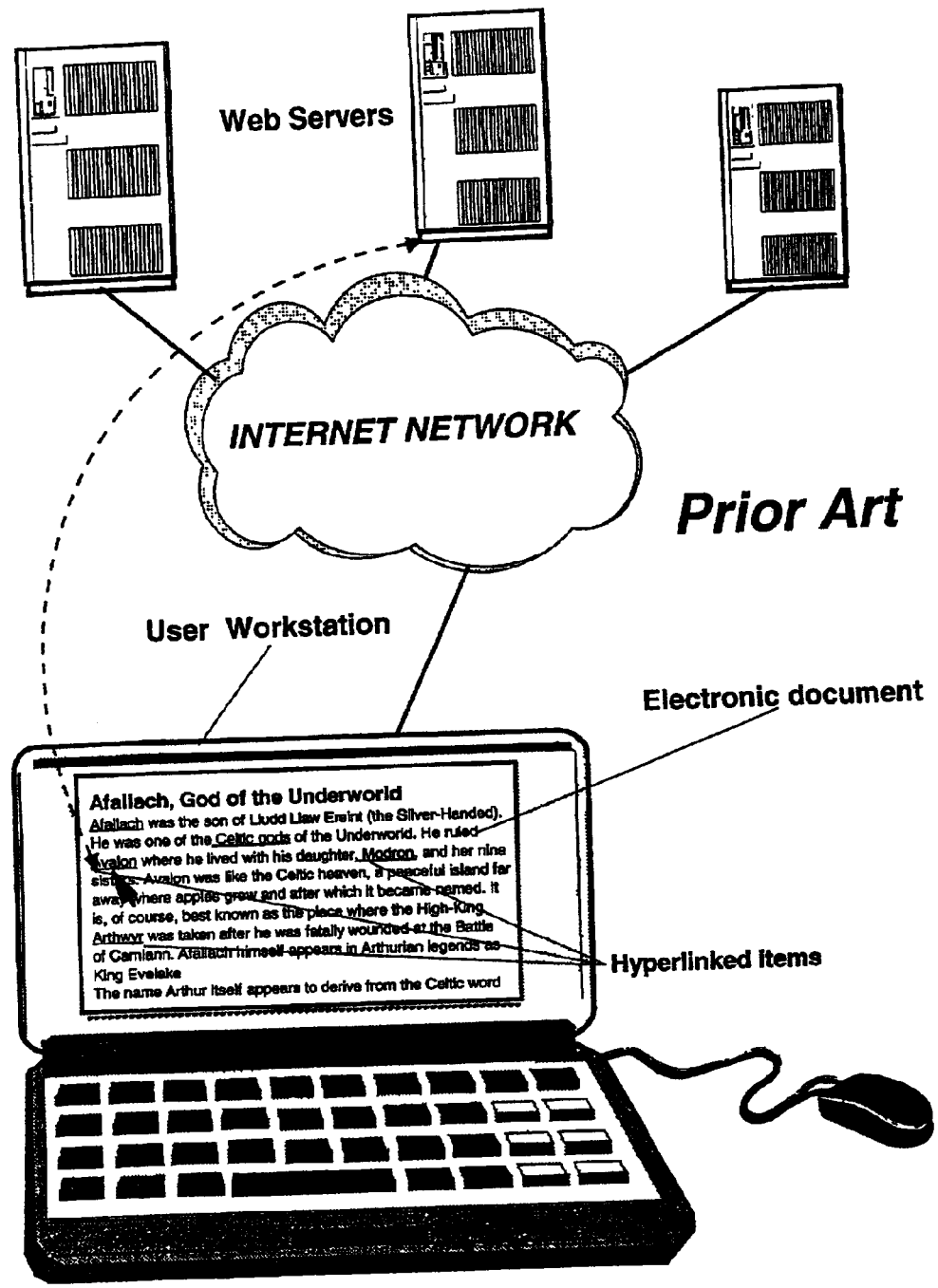
FIG. 1 shows the conventional method for accessing hypermedia information or services directly from an hyperlinked electronic document (e.g., by activating a hyperlink on a Web page).
Figure 2:
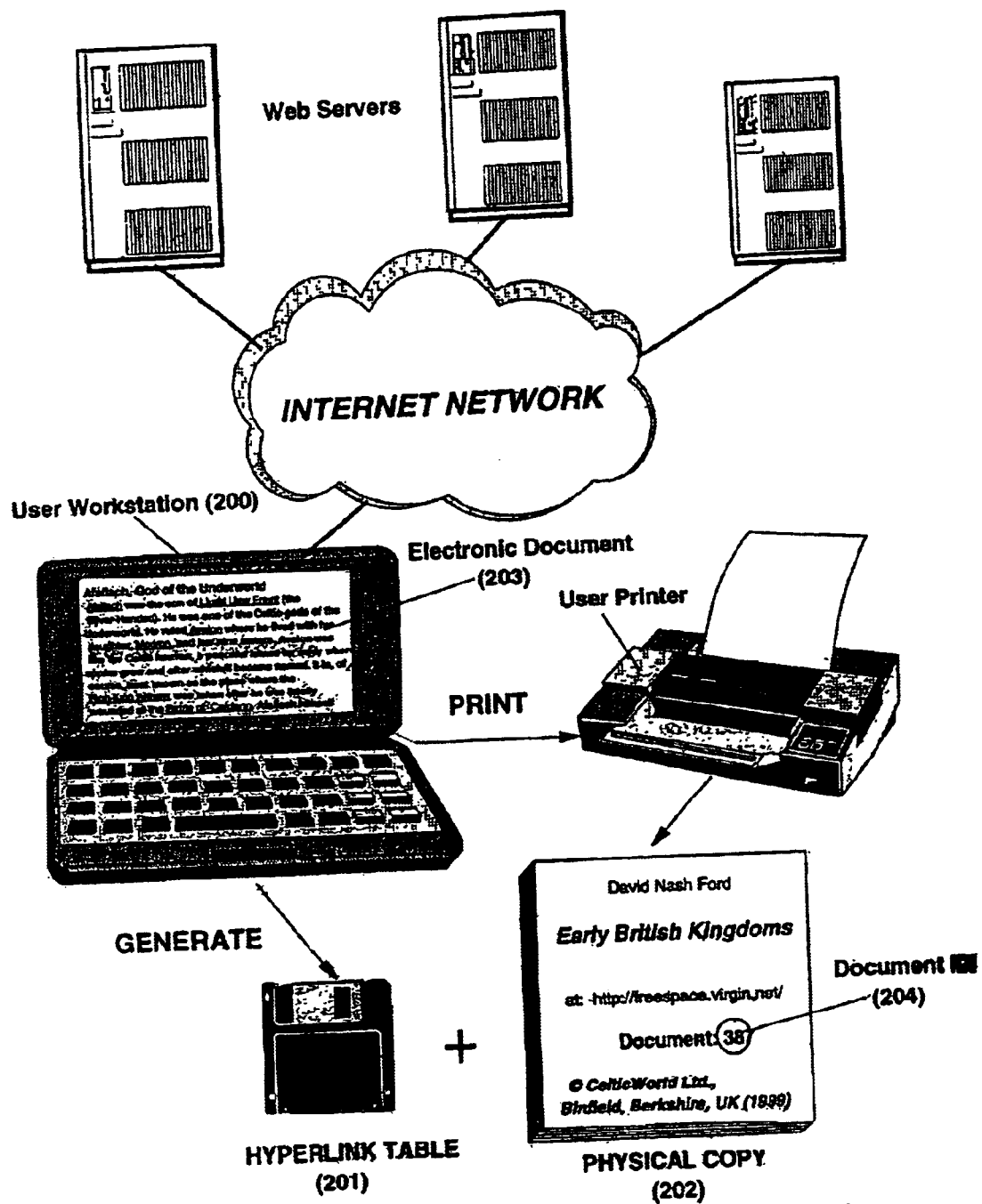
FIG. 2 is a general view of the system and method for generating, from an hyperlinked electronic document, a physical copy and an associated hyperlink table according to the present invention.

As shown in FIG. 2, the user receives an electronic document like, for example, a "e-book" (i.e., an electronic book) entitled "Early British Kingdoms" in Adobe™ Portable Document Format (PDF).

Note: An Adobe PDF file offers an exact representation of a printed document. There are special tools from Adobe and third party vendors for easily creating an Adobe PDF file. If the existing digital content of the file is available in Post-Script (as are many archived printed materials), the file can be directly converted into Adobe PDF. Adobe PDF files can also be directly generated from HTML files, from documents created with Lotus Word Pro, Microsoft Office, or virtually from any electronic file. With the Adobe PDF creation process, links and bookmarks from table of contents, index, or any cross-references can be automatically generated. Once created, Adobe PDF files can be distributed digitally, exactly as intended. It is important to note that it is possible to create with Adobe Acrobat, PDF hyperlinked documents. Article entitled "Create a Web Link", Adobe Tips & Techniques, which can be found on the Web site: http://www.adobe.com/epaper/tips/acweblinks/main.html describes the technique for creating Web hyperlinks with Adobe Acrobat 4.0 PDF documents. Adobe PDF files can be linked to any URL, whether this URL is a path to a local file or a Web site. Also URLs can be added to PDF documents by importing them from a file or a Web site. The hyperlink information (i.e., hyperlink sources, hyperlink names and destination URLs) of a PDF file is stored in the "Hyperlinks palette" of the file.

FIG. 8 shows a preferred embodiment of the invention. The method for generating (or creating) an hyperlink table (201) from an electronic document (203) comprising one or a plurality of hyperlinks, for associating said hyperlink table to a physical copy (202) of this electronic document, and for selecting and accessing information or services (301) simply by touching over this physical copy (303) the positions corresponding to the hyperlinked items (302) of the electronic document (203), comprises the steps of:

(801) assigning a reference number to a physical copy of an electronic document;

(802) creating an hyperlink table and associating said hyperlink table with the physical copy using the assigned reference number;

(803) identifying the one or plurality of hyperlinks comprised in the electronic document; retrieving from the electronic document, information related to each identified hyperlink, said information comprising hyperlink name or description, linked service and destination URL and copying said information in the hyperlink table;

(804) defining the relative scale of the physical copy compared with the electronic document;

(805) retrieving from the electronic document, electronic coordinates of each identified hyperlinked item and translating said electronic coordinates to physical coordinates on the physical copy;

(806) storing said physical coordinates in the hyperlink table associated with the physical copy;

(807) generating the physical copy of the electronic document; printing on the physical copy a reference number; and printing on each page of the physical copy, a page number;

(808) storing or transmitting the physical copy and the associated hyperlink table.

(801) Assigning a Reference Number to the Physical Copy

The user assigns a reference number (e.g., 387) for identifying the physical copy of the electronic document and the hyperlink table associated with this physical copy. For example, a document can be uniquely identified by the combination of the seller ID and the document ID. Standards like "*Digital Object Identifiers*" (DOI) that can be used for generating documents IDs. More information on DOI can be found on:

http://www.doi.org.

Alternatively, the reference number can be automatically assigned by the user workstation from a list of stored reference numbers.

(802) Creating an Hyperlink Table and Associating said Hyperlink Table with the Physical Copy The system then:

creates an hyperlink table (e.g. a new table, or a new record in a database) accessible from the workstation. This hyperlink table comprises the reference number of the physical copy;

optionally the user stores in the header of this hyperlink table other relevant information related to the electronic document such as title, author, ISBN (International Standard Book Number), date of creation, etc . . .

The hyperlink table may be stored within the user workstation or may be stored in an external memory accessible from the user workstation.

The header of the new created hyperlink table associated with the e-book (electronic book) entitled "Early British Kingdoms", shown in FIG. 2, can be built as follows:

| Doc: 0387 | Title: "Early British Kingdoms" | Author: David Nash Ford of Binfield, Berkshire, UK |
|---|---|---|
| | Date: 28/01/2000 | ISBN: 84-344-0856-2 |
| Pg: X= | Y= Link: | |

(803) Copying Information related to Hyperlinks from the Electronic Document to the Hyperlink Table The information related to hyperlinks (such as hyperlink name or description, type of service, destination URL . . . ) comprised in the data structure associated with the electronic document is identified and copied in the hyperlink table of the physical copy;

Using the present method, the list of hyperlinked items and hyperlinks destination addresses (e.g., URLs) of the PDF file of the e-book entitled "Early British Kingdoms" shown in FIG. 2, is copied from the "*Hyperlinks palette*" of the PDF file to the hyperlink table by means API techniques described by Adobe in document entitled "*Adobe Solutions Network: Developer Program*" that can be accessed on the Web site:

http://partners.adobe.com/asn/developer/acrosdk/docs.html.

Once this step completed, the hyperlink table appears as follows:

| Doc: 0378 | Title: "Early British Kingdoms" | Author: David Nash Ford of Binfield, Berkshire, UK |
|---|---|---|
| | Date: 28/01/2000 | ISBN: 84-344-0856-2 |
| | Link: Buelit & Gwerthrynion | http://freespace.virgin.net/david. |

-continued

| | | ford2/buellt.html |
| Link: Caer-Baddan (Bath) | | http://freespace.virgin.net/david.ford2/south.html#Gloui |
| Link: Caer-Celemion (Silchester) | | http://freespace.virgin.net/david.ford2/vortigern.html |
| Link: Ceredigion | | http://freespace.virgin.net/david.ford2/ceredigion.html |
| ........ | ........ | ........ |
| | Link: Editor Phone Number | Phone://54-26-555-1234 |
| ........ | ........ | ........ |
| ........ | ........ | ........ |
| | Link: Mabinogion | http://www.cyberphile.co.uk/~taff/taffnet/mabinogion/mabinogion.htm |
| | Link: Avalon | http://freespace.virgin.net/david.ford2/avalon.html |
| | Link: Afallach | http://freespace.virgin.net/david.ford2/gods.html#Afallach |
| | Link: Beli Mawr | http://freespace.virgin.net/david.ford2/gods.html#Beli |
| ........ | ........ | ........ |
| ........ | ........ | ........ |
| | Link: St.Joseph of Arimathea | http://freespace.virgin.net/david.ford2/joseph.html |
| | Link: The Kings of Dumnonia | http://freespace.virgin.net/david.ford2/dumnonia.html |
| | Link: Eudaf Hen & Conan Meri | http://freespace.virgin.net/david.ford2/eudanc.html |
| ........ | ........ | ........ |

The information or service associated with the hyperlinked item may be stored locally in the user workstation. In this case, an identification of the information or service (local address, file name, exec name . . . ) within the user workstation must be stored in the hyperlink table.

(804) Determining the Relative Scale of the Physical Copy Compared with the Electronic Document;

This step is optional if the dimensions of the electronic document, as shown on the user workstation screen are identical to the dimensions the printed document This is the case for files edited with modern word processors, like Lotus Word Pro, MS Word or Adobe Acrobat.

If the dimensions of the displayed document and the dimensions of the printed document are different (i.e., if the vertical or horizontal dimensions are reduced or magnified), then the horizontal (X) and vertical (Y) dimensions (e.g., in millimeters) of the printed document must be specified.

The object of this step is to compute two scale factors (for axis X and Y) for transforming the coordinates (Xe, Ye) of each hyperlinked item in the electronic document (e.g., coordinates of a point centered on the position of an hyperlinked item, word or picture) into "paper" coordinates. The paper coordinates of a point located on a hard-copy document comprise two components:

a page number (optionally if the physical document comprises a plurality of pages); and page coordinates (Xp, Yp).

Transformation of "electronic" coordinates into "paper" or "physical" (hard-copy or printed) coordinates is illustrated in FIG. 4 with the PDF electronic book entitled "*Early British Kingdoms*". Since Adobe PDF files offers the exact representation of the printed document, the step of determining the scale factors is not required in the present case. Scale factors of 1.0 for X and Y dimensions are used by default to perform the transformation of "electronic" coordinates to "paper" coordinates.

(805) Translating the Electronic Coordinates of each Hyperlinked item into Physical Coordinates Using the scale factors computed in the previous step (804), (or the default scale factors equal to of 1.0), the electronic coordinates of the hyperlinks comprised in the electronic document are translated into physical coordinates. Electronic coordinates of hyperlinked items are retrieved from the electronic document. The physical coordinates of an hyperlinked item correspond to the position of said hyperlinked item on the physical document. The physical coordinates are preferably expressed as follows:

page number (if the physical document comprises a plurality of pages), and page co ordinates (Xp, Yp) (position of the hyperlinked item on the page corresponding to the page number).

As shown in FIG. 4, the "electronic" coordinates (Xe, Ye) of the hyperlinked item "Beli Mawr", (401) on the electronic document (e.g., on an HTML page) are translated into the "paper" or "physical" coordinates with:

a page number (402) (page 116), and page coordinates (Xp, Yp) (403).

Since an Adobe PDF file is the exact representation of the printed copy, the page numbers and page coordinates measured when the PDF file is displayed in full size with Acrobat Reader are the same as the page numbers and page coordinates measured on the printed copy of the same PDF file.

(806) Storing Physical Coordinates of Hyperlinked Items in the Hyperlink Table Once the translation of "electronic" coordinates into "paper" or "physical" coordinates is completed, the hyperlink table is updated. The physical coordinates of each hyperlinked item in the electronic document are copied in the hyperlink table as follows:

| Doc: 0378 | | Title: "Early British Kingdoms" Date: 28/01/2000 | Author: David Nash Ford of Binfield, Berkshire, UK ISBN: 84-344-0856-2 |
|---|---|---|---|
| Pg: 3 | | | |
| X=45 | \|Y=130 | Link: Buelit & Gwerthrynion | http://freespace.virgin.net/david.ford2/buellt.html |
| X=205 | \|Y=170 | Link: Caer-Baddan (Bath) | http://freespace.virgin.net/david.ford2/south.html#Gloui |
| X=75 | \|Y=190 | Link: Caer-Celemion (Silchester) | http://freespace.virgin.net/david.ford2/vortigern.html |
| X=110 | \|Y=255 | Link: Ceredigion | http://freespace.virgin.net/david.ford2/ceredigion.html |
| ........ | | | |
| X=30 | \|Y=260 | Link: Editor Phone Number | Phone://54-26-555-1234 |
| ........ | | | |
| Pg: 116 | | | |
| X=30 | Y=95 | Link: Mabinogion | http://www.cyberphile.co.uk/~taff/taffnet/mabinogion/mabinogion.htm |
| X=255 | \|Y=150 | Link: Avalon | http://freespace.virgin.net/david.ford2/avalon.html |
| X=225 | \|Y=160 | Link: Afallach | http://freespace.virgin.net/david.ford2/gods.html#Afallach |
| X=190 | \|Y=230 | Link: Beli Mawr | http://freespace.virgin.net/david.ford2/gods.html#Beli |
| ........ | | | |
| ...... | | | |
| Pg: 139 | | | |
| X=25 | \|Y=30 | Link: St.Joseph of Arimathea | http://freespace.virgin.net/david.ford2/joseph.html |
| X=80 | \|Y=75 | Link: The Kings of Dumnonia | http://freespace.virgin.net/david.ford2/dumnonia.html |
| X=140 | \|Y=135 | Link: Eudaf Hen & Conan Meri | http://freespace.virgin.net/david.ford2/eudanc.html |
| ........ | | | |

For example, on page 116 of physical document 387 (hyperlink table ID) entitled "*Early British Kingdoms*" written by David Nash Ford of Binfield, the page coordinates of the hyperlinked word "Mabinogion" are X=30 /Y=95. The hyperlinked word "Mabinogion" points to the URL address: http://www.cyberphile.co.uk/~taff/taffnet/mabinogion/mabinog ion.htm.

(807) Generating the Physical Copy of the Electronic Document

As shown in FIG. 2, the print or physical copy (202) of the electronic document (203) is generated, and the reference number or Document ID (204) is marked on it. This reference number 38 (204) is used to identify, both the physical copy and the associated hyperlink table.

(808) Storing or Transmitting the Physical Copy and the Associated Hyperlink Table As shown in FIG. 10, the present method generates at the same time a physical copy of the original electronic document, and an hyperlink table. Both of them can be locally stored or transmitted over the network to other users or systems. Any hard-copy document in portable format (e.g., in PostScript, PDF, LWP, etc.) can be transmitted as a file ready to be printed by the end user.

From a received a physical document and an hyperlink table, all multimedia services defined in the hyperlink table can be accessed and retrieved from the Web simply by activating the hyperlinks by means of an opto-touch foil placed over the pages of the physical copy.

Activating Hyperlinks from the Physical Copy

As illustrated in FIG. 10, an hyperlink table is associated with a physical (printed) copy of an electronic document (in the present example, the document is entitled *"Early British Kingdoms"*, (Doc: 387). The hyperlink table (608) is loaded in the user workstation (600). The method, described in FIG. 9, for locating, visualizing and highlighting hyperlinked items on the physical copy, and for accessing information and/or services directly from the hyperlinked items highlighted on the pages of the physical copy, comprises the steps of:

(901) selecting the hyperlink table associated with the physical copy by specifying the reference number of the physical copy;

(902) selecting a page of the physical copy and specifying the page number;

(903) identifying for the selected page the positions of hyperlinked items referring to the hyperlink table, said hyperlink table comprising for each page of the document, a list of hyperlinked items, and for each hyperlinked item, an indication of the position on an opto-touch foil;

(904) illuminating (or visualizing, or highlighting) the position corresponding to each of said hyperlinked items by means of an opto-touch foil connected to the user workstation;

(905) placing and aligning the opto-touch foil over (or under) the selected page;

(906) selecting an hyperlinked item on the selected page by pressing the opto-touch foil on the illuminated point (light spot) corresponding to the selected hyperlinked item;

(907) determining the position of the point pressed on the opto-touch foil;

(908) identifying the selected hyperlinked item referring to the hyperlink table, this hyperlink table comprising an indication of the position of each hyperlinked item (illuminated item) on the selected page of the document;

(909) identifying the information or/and the service associated with the selected illuminated item referring to the hyperlink table, this hyperlink table comprising for each illuminated item of the selected page the identification of the requested information and/or service within the user workstation or within the network (preferably by means of a destination address);

(910) accessing the information and/or service;

(911) retrieving and displaying this information and/or service on the user workstation.

(901) Specifying the Reference Number of the Physical Copy

By means of any user interface (keyboard, mouse, touch screen, . . . ) or any reading means (bar code reader . . . ), the user enters the reference number (identifier) of the physical document (e.g.: document 387) he wants to select. In the particular embodiment shown in FIG. 6, the user enters the reference number of the physical document (e.g.: Doc: 387) by means of an array of pressure sensible "touch buttons" printed on the opto-touch foil. The user presses in the following order:

a touch button marked "Doc, (612) and then numerical touch buttons (613) corresponding to each digit of the physical document reference number (e.g., "3", "8" and "7")

This procedure gives access to the hyperlink table associated with this document.

(902) Selecting a Page and Highlighting Hyperlinks on the Selected Page

By means of any user interface (keyboard, mouse, touch screen . . . ) or any reading means (bar code reader . . . ), the user enters the page of the physical document (or the portion of the document) (e.g.: page 16) he wants to select. In the particular embodiment shown in FIG. 6, by means of the array of pressure sensible touch buttons printed on the opto-touch foil, the user enters the page number to select (e.g.: Pg. 116). The opto-touch foil can be on any position (normally the opto-touch foil is placed over the page comprising the hyperlink to trigger). The user presses in the following order:

a touch button marked as "Pg" (614), and then numerical touch buttons (613) corresponding to each digit of the page number (e.g., "1", "1" and "6") to select.

This procedure gives access to the selected page (e.g., Pg. 116) within the hyperlink table associated with the selected document (e.g., Doc: 387).

(903) Identifying the Position of Predefined Hyperlinked Items referring to the Hyperlink Table The page coordinates Xp and Yp (501) of all the hyperlinked items (504) previously defined for the page (502) selected by the user are retrieved from the hyperlink table (608) and sent by the user workstation (600) to the opto-touch foil (605).

(904) Illuminating the Positions Corresponding to each of said Predefined Hyperlinked Items The opto-touch foil (605) receives the information sent by the user workstation (600). This information comprises the position (coordinates Xp and Yp) of each hyperlinked item defined on the selected page. The opto-touch foil decodes this information and visualizes (highlights or illumines) the position of each of the hyperlinked items (607).

(905) Placing and Aligning the Opto-touch Foil over the Selected Page of the Physical Copy Once a physical document and a page have been selected, the opto-touch foil (605) generates one or a plurality of light spots (607) signaling that one or more hyperlinks have been defined for this page. Then, the opto-touch foil is:

placed over (or under) the page, and aligned with the borders of the selected page by some conventional means (e.g., by adjusting the upper left corner of the touch foil with the upper left corner of the page).

As shown also on FIG. 6, the opto-touch foil is placed and aligned over the selected page. The position of the light spots (607) emitted by the opto-touch foil corresponds to the position of the hyperlinked items defined for this page. The hyperlinked items appear through the transparent opto-touch foil and are identified by the user thanks to the light spots emitted by the opto-touch foil.

(906) Selecting an Illuminated Item on this Page

As shown in FIG. 6, the user selects an (hyperlinked) item ("Avalon") on the page by pressing (e.g., by means of his fingertip) the opto-touch foil on the illuminated point (609) corresponding to the selected item.

(907) Determining the Position on the Page of the Point Pressed on the Opto-touch Foil When a particular point on the opto-touch foil (605) is pressed, a signal is sent to the user workstation (600) to identify the selected item. This signal indicates the position on the page of the point that has been pressed by the user on the opto-touch foil. The generated signal is generally proportional to the coordinates (Xp/Yp) of the point that has been pressed. In our example, the opto-touch foil measures the position on the selected page of the point that has been pressed (near the light spot over the word "Avalon") by the user. The coordinates measured at this point are around Xp=255 and Yp=150.

(908) Identifying the Selected Item

The illuminated item selected on the opto-touch foil (605) by the user is identified thanks to the hyperlink table. The hyperlink table comprises an indication of the coordinates Xp and Yp (501) of each illuminated item (504) on each page (502) of the physical document. In our example, the coordinates measured by the opto-touch foil are around (close to) Xp=255 and Yp=150. They corresponds in the hyperlink table to the hyperlinked item "Avalon".

(909) Identifying the Information Associated with the Selected Item

The hyperlink table comprises for each hyperlinked (illuminated) item (504) of each page (502) of the physical document the location within the network of the requested information and/or service (503). The information and/or service may be located by means of a destination address. In the Internet network, Web pages in Web Servers are identified by an URL (Uniform resource Locator). In our example, the hyperlink table associates the illuminated item "Avalon" with the URL:

http://freespace.virgin.net/david.ford2/avalon.html (910) Accessing the Information and/or Service The user workstation Web activates the hyperlink (destination address, URL, . . . ) associated in the hyperlink table, with the identified selected hyperlinked item. In our example, the hyperlink labeled "Avalon" is activated since the system determines from the hyperlink table that, for this page (i.e., Pg. 116), Xp=255, Yp=150 are the physical coordinates of the hyperlinked item located the nearest to the pressed position. Thus, in this example, a simple pressure near the illuminated item "Avalon" automatically activates the following hyperlink on the Web:

http://freespace.virgin.net/david.ford2/avalon.html (911) Retrieving and Displaying the requested Information and/or Service The information comprised at the selected destination address (URL) can be displayed (301) on the user workstation (300). Additional information (e.g., document number, page number, hyperlinked item, physical coordinates on the foil and URL) related to the hyperlinked (illuminated) item selected by the user can be shown on the Web Browser along with the information retrieved from the Web Server.

The hyperlinked physical documents according to the present invention can be generated from electronic documents like, for example, technical manuals with illustrations and flowcharts in Microsoft Word, the latest novels and biographies created by Adobe PageMaker, financial business analyses created in QuarkXpress, electronic dictionaries, encyclopedias, or even information published from an office application, like Lotus SmartSuite or information captured from the Web.

What has been described is merely illustrative of the application of the principles of the present invention. Other arrangements and methods can be implemented by those skilled in the art without departing from the spirit and scope of the present invention.

What is claimed is:

1. A method, for use in a user system (200), of generating an hyperlinked physical copy of an electronic document (203) comprising one or a plurality of hyperlinks, said method comprising the steps of:

selecting an electronic document (203);

creating (802) an hyperlink table (201);

associating (802) said hyperlink table with a physical copy (202) of said electronic document, said physical copy comprising one or a plurality of pages;

for each page of the physical copy:

identifying (803) in the electronic document, the one or plurality of hyperlink items comprised in the page;

storing (803) in the hyperlink table an identification of each identified hyperlink item;

retrieving (803) from the electronic document identification and location of information and/or service associated with each identified hyperlink item on the page;

storing (803) in the hyperlink table said identification and location of information and/or service associated with each identified hyperlink item;

retrieving (805) from the electronic document, electronic coordinates of each identified hyperlinked item on the page;

translating (805) said electronic coordinates into physical coordinates on the page of the physical copy;

storing (806) said physical coordinates in the hyperlink table.

2. The method according to claim 1 wherein said physical copy (202) is a paper printed copy of said electronic document (203).

3. The method according to claim 1 wherein the step of creating an hyperlink table, comprises the further step of:

storing in said hyperlink table an identification of the physical copy.

4. The method according to claim 1 wherein the step of identifying (803) in the electronic document, the one or plurality of hyperlink items comprised in the page, comprises the further step of:

storing in the hyperlink table an identification of the page.

5. The method according to claim 1 wherein the step of translating said electronic coordinates into physical coordinates on the page of the physical copy, comprises the step of:

defining (804) the relative scale of the physical copy compared with the electronic document.

6. The method according to claim 1 wherein said user system (300) is connected to a communication network (305) comprising one or plurality of servers (306), and wherein the information and/or service associated with each hyperlinked item are located on said one or plurality of servers (306).

7. The method according to claim 1 wherein the information and/or services associated with each hyperlinked item are located on the user system.

8. The method according to claim 1 wherein the step of storing (803) in the hyperlink table said identification and location of information and/or service associated with each identified hyperlink item, comprises the step of:

storing a destination address in the communication network where the information and/or service associated with the hyperlinked item can be accessed.

9. The method according to claim 1 wherein:

said communication network (305) is an Internet Protocol (IP) network;

said servers (306) are Web servers;

said user system (300) comprises a Web browser;

said destination address is an Uniform Resource Locator (URL address);

said information and/or service are Web pages.

10. The method according to claim 1 wherein an hyperlinked item is a word, a letter, an icon, a graphic, a symbol, a mark or any other sign.

11. The method according to claim 1 comprising the further step of:

storing in the hyperlink table additional information related to said physical document such as title, author, date.

12. The method according to claim 1 wherein each page is a portion of said physical document.

13. The method according to claim 1 comprising the further steps of:

identifying a page of the physical copy, said page comprising one or a plurality of hyperlinked items;

identifying position of hyperlinked items comprised in said identified page referring to the hyperlink table associated with the physical copy, said hyperlink table comprising for each page of the document, a list of hyperlink items, and for each hyperlink item, the physical coordinates on said page;

sending for visualization on an opto-touch foil, the physical coordinates of said hyperlinked items, said opto-touch foil being connected to the user system.

14. The method according to claim 1 comprising the further steps of:

determining the physical coordinates of a point pressed on said opto-touch foil; said opto-touch foil being placed and aligned over or under the identified page of the physical copy; each one of hyperlinked items on said page corresponding to a visualized position on said opto-touch foil; said opto-touch foil being pressed at a point corresponding to a selected hyperlinked item;

identifying the selected hyperlinked item corresponding to the physical coordinates of the point pressed on said opto-touch foil referring to the hyperlink table, said hyperlink table comprising the physical coordinates of each hyperlinked item on the identified page;

identifying and locating information and/or service associated with the selected hyperlinked item referring to the hyperlink table, said hyperlink table comprising for each hyperlinked item of each page of the document the identification and location of the information and/or service associated with the hyperlinked item;

accessing the information or service associated with the selected hyperlinked item.

15. An hyperlink table generated according to the method according to claim 1.

16. An user system comprising means adapted for carrying out the method according to claim 1.

17. A system comprising:

an opto-touch foil to be placed over or under a page of a physical document;

a user system according to claim 1;

a connection between said opto-touch foil and said user system.

18. The system according to claim 1 wherein the opto-touch foil is sensible to the pressure exercised over any point and comprises a transparent film with light emitting elements for visualizing selected positions on its surface.

19. A computer program comprising computer readable instructions for carrying out the method according to claim 1.

* * * * *